Aug. 23, 1932.  H. E. KUEHN  1,873,603
SEAT
Filed Nov. 19, 1930  3 Sheets-Sheet 1
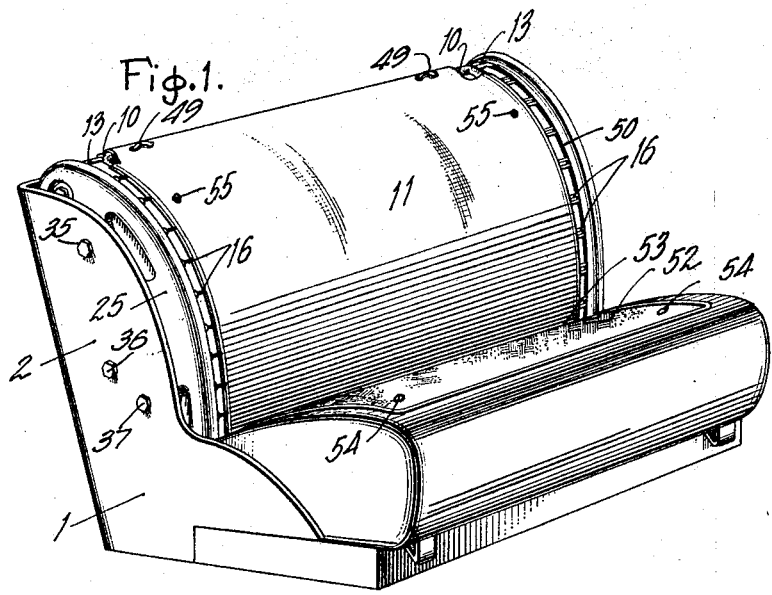
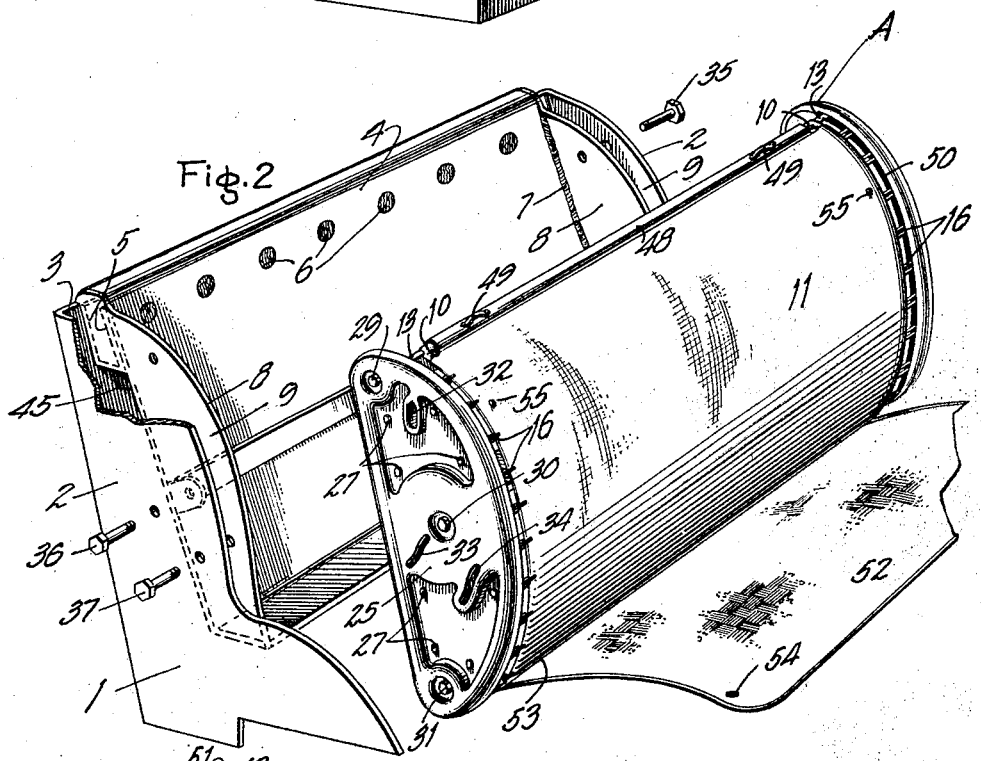
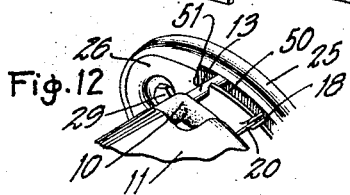
Inventor:
Harry E. Kuehn.
by *His Attorneys*

Aug. 23, 1932.        H. E. KUEHN        1,873,603
SEAT
Filed Nov. 19, 1930        3 Sheets-Sheet 2
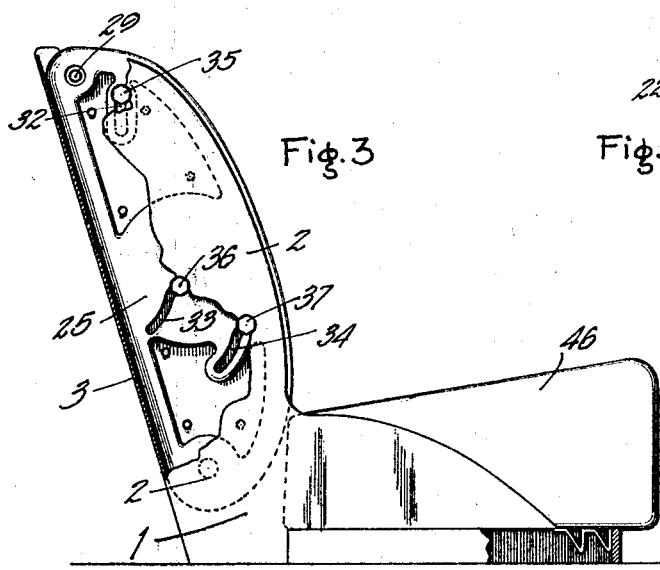
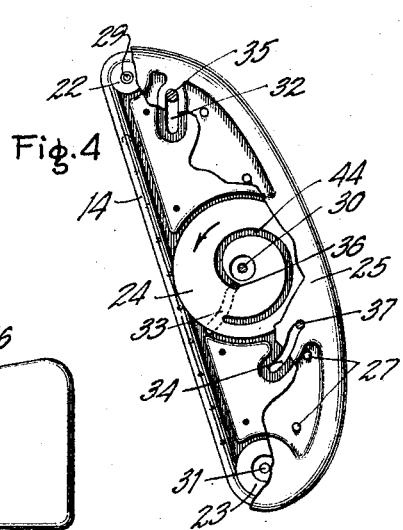
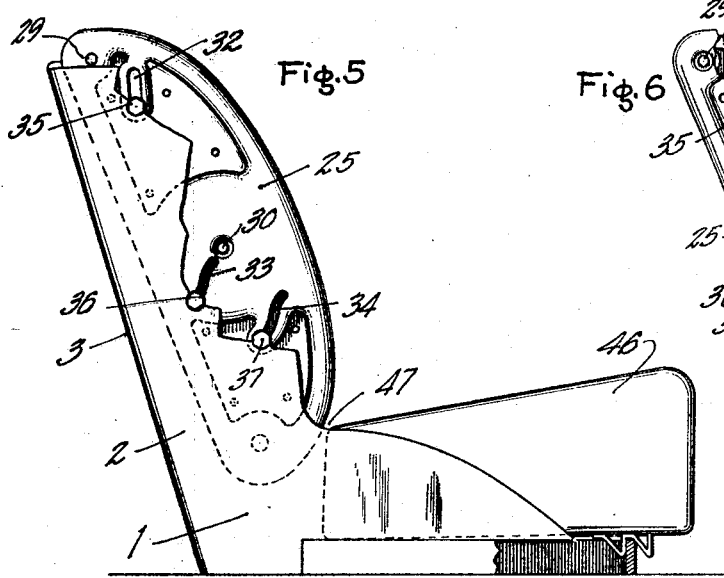
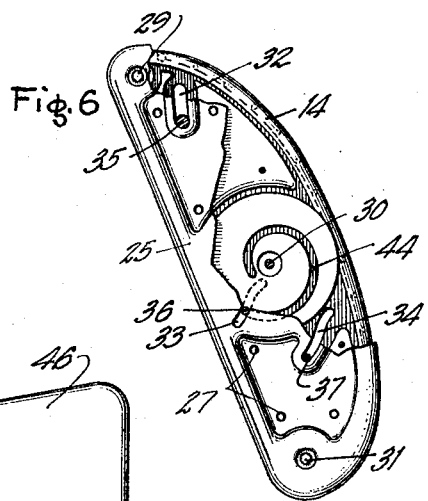
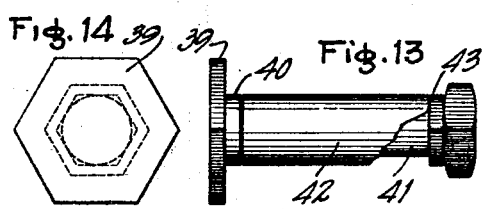
Inventor:
Harry E. Kuehn,
by
His Attorneys Aug. 23, 1932. H. E. KUEHN 1,873,603
SEAT
Filed Nov. 19, 1930 3 Sheets-Sheet 3
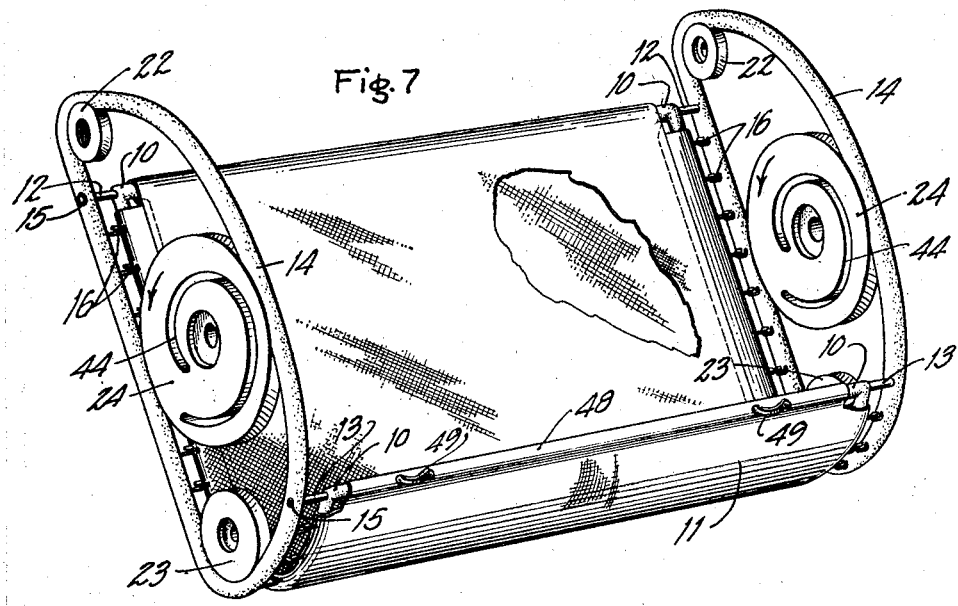
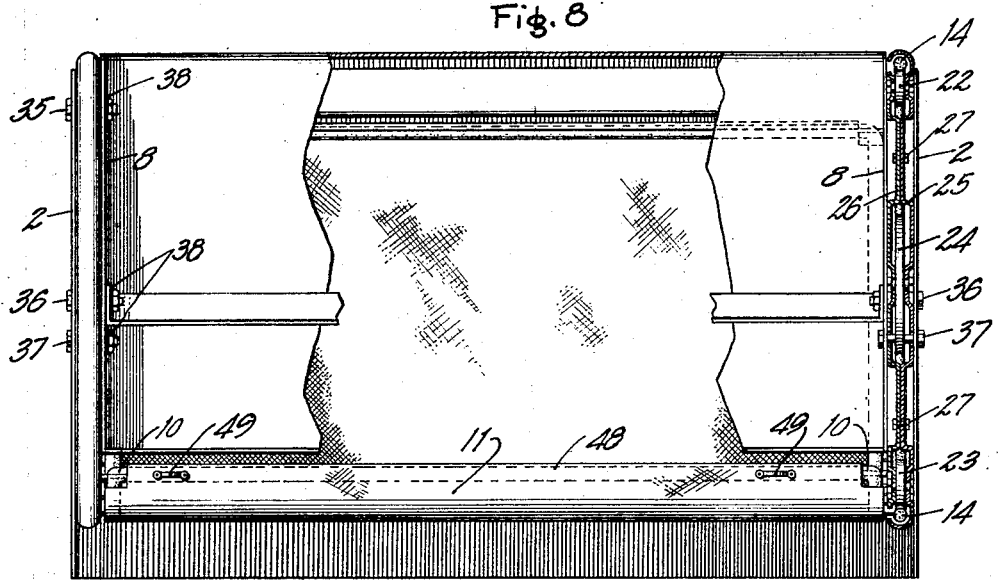
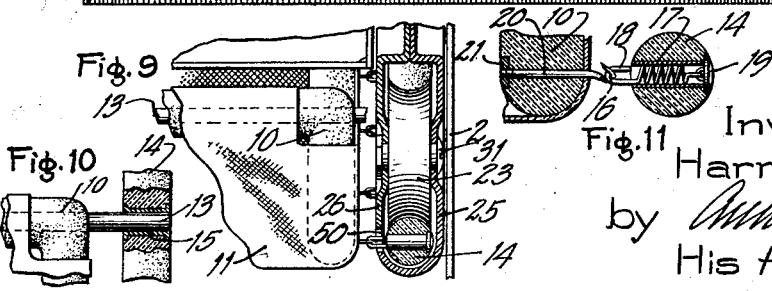
Inventor:
Harry E. Kuehn
by
His Attorneys Patented Aug. 23, 1932

1,873,603

UNITED STATES PATENT OFFICE

HARRY E. KUEHN, OF ALBANY, NEW YORK

SEAT

Application filed November 19, 1930. Serial No. 496,654.

My invention relates to seats and particularly to structures of this character for use in motor vehicles, railroad coaches and the like. More particularly it relates to a cover for use in connection with the ordinary type of seat used in motor vehicles whereby the comfort of the occupant is promoted especially in hot weather.

One of the objects of my invention is to provide a device of this character which may be built into the ordinary seat and which, when not in use, will be entirely concealed but, on the other hand, may be quickly and easily moved from its place of concealment to form a cool and comfortable cover for the seat back or for both the main seat and back. Another object is to provide a seat cover in which the back portion when functioning as a cover will not lie closely against the upholstery of the ordinary seat but will normally be somewhat spaced therefrom to provide for the circulation of air between the upholstery and the cover thereby making the seat cooler and more comfortable for the occupant and avoiding all wear on the upholstery. Another object is to provide a cover of this character which will be spring suspended so that it will always retain its shape and provide a comfortable resilient rest for the back of the occupant.

With these objects in view my invention includes the novel elements and the combinations and arrangements thereof described below and illustrated in the accompanying drawings in which—

Fig. 1 is a perspective view of a seat showing my cover in position for use; Fig. 2 is a perspective view with parts broken away to show the construction of the seat frame used with my invention and in which the cover is pulled forward and out of the seat frame to show the construction thereof; Fig. 3 is a side view, with parts broken away, of an automobile seat embodying my invention and which shows the relative position of the parts when the cover is in concealed position; Fig. 4 is a side view of a detail of my invention, showing the same detail in the same position as in Fig. 3 but with more remote parts broken away to show the relative position of certain pins, cams and guide slots when the seat is in concealed position; Fig. 5 is a side view with parts of the frame broken away showing my seat when the cover is drawn out into position for use; Fig. 6 is a side view of the same detail shown in Fig. 4 but indicating the relative position of the pins, cams and guide slots when the cover is in position for use; Fig. 7 is a perspective detail of portions of my seat cover when in concealed position; Fig. 8 is a front view of the seat frame and cover when in concealed position, with parts broken away. This view may be said to be a front view of Fig. 3 with the ordinary upholstery removed; Fig. 9 is an enlarged detail view of the right hand lower corner of Fig. 8 and shows the manner in which the seat cover is connected to the carrying belt; Fig. 10 is a detail showing how the seat cover is connected to the belt at one corner; Fig. 11 is an enlarged fragmentary section through the belt of a portion of the flexible cover frame showing how the frame is connected to the belt; Fig. 12 is an enlarged perspective detail of the portions A in Fig. 2; Fig. 13 is a detail elevation of a bolt and bearing used in my device; and Fig. 14 is an end view of Fig. 13.

Referring to the drawings, and particularly to Figs. 1, 2, 3 and 5 thereof, 1 represents generally the outside frame of a seat embodying my invention. This is preferably a metal stamping which forms the ends 2 of the seat frame, the outer back 3, and an inner back 4 which is offset from the outer back to provide a space therebetween in which the seat cover is concealed when not in use. At the top, the inner and outer back are maintained in spaced relation by the U-shaped element 5 (see Fig. 2) which is welded to the inner and outer back as shown at 6. Welded to the inner back, as shown at 7 (see Fig. 2) and spaced from the end portions 2 of the outer frame are the inner end portions 8. Thus, between the portions 2 and the portions 8 there is formed at each end of the seat a recess 9 designed to receive the operating mechanism of my device.

Before describing in detail the cover portion of my seat, and the operating mechanism therefor, it may be well to say that the device operates very much in principle like a roll top desk and a fair general idea of the structure may be had from an examination of Fig. 7 in which merely the pulleys or sprockets and the endless belt or chain which supports the cover are shown in assembled relation. That is, 10 represents a frame of flexible material such as leather about which is stretched the cover 11 for the back portion of the seat. This cover may be made of fancy material, plain duck or any other suitable fabric which may match the surroundings if desired. The frame 10 is rectangular and is reinforced by bars 12 and 13 respectively. These bars are connected to the endless belt 14 as shown in Fig. 10, bushings 15 being provided in the belt 14 which function as bearings for the rods 12 and 13. The sides of the frame are also connected to the endless belt 14 at spaced intervals by means of the hooks and resilient eyes represented generally at 16 and shown in detail in Fig. 11. That is, bushings 17 are inserted in the endless belt or chain 14 and these house the spring eyes 18 secured to the buttons 19. Hooks 20 which coact with the eyes 18 are inserted in the flexible frame 10 and secured thereto by means of nuts 21. The element 14 which is, for convenience, shown as a belt, and may be and preferably is a flexible chain, runs over the upper pulley or sprocket 22, the lower pulley or sprocket 23 and the intermediate cam, pulley or sprocket 24.

Housings for the belt 14 and the pulleys are provided at each end of the seat frame and are designed to fit in the recesses 9. These housings are identical except that they are made right and left and the outside appearance is shown in perspective in Fig. 2. Each housing comprises two metal stampings 25 and 26, shown in section at the right side of Fig. 8, and these stampings are secured together by bolts 27. Bolts 29, 30 and 31, similar to the bolt shown in Figs. 13 and 14, form the bearings for pulleys 22, 24 and 23 respectively.

Inasmuch as it is desirable that the cover for the back portion of the seat should, when in position for use, be spaced somewhat from the upholstery in order to provide for ventilation between the upholstery and the cover and also to prevent wear on the upholstery, and inasmuch as it is desirable that the cover and the cover mechanism be as inconspicuous as possible when the cover is in concealed position, I provide the following means for automatically and simultaneously raising and moving forward the cover and its mechanism when the cover is pulled into position for use.

Referring first to Fig. 2, it will be observed that each belt and pulley housing is provided with three slots, 32, 33 and 34 through which pass bolts 35, 36 and 37 respectively. These bolts also pass through the end portions 2 and 8 of the seat frame and the nuts thereon are welded to the inner end portion 8 of the frame as shown at 38. The nuts, of course, are concealed beneath the ordinary seat upholstery and are welded in place so that the bolts 35, 36 and 37 may function and be removed from the exterior as cap screws rather than bolts.

Referring to Figs. 13 and 14 which illustrate bolts 36, for example, it will be observed that just beneath the head 39 there is a shoulder 40 of a length or width slightly greater than the thickness of the end portion 2 of the seat. The main body 41 of the bolt is somewhat smaller and is provided with a sleeve 42 designed to fit in the slots in the housings. This sleeve is secured in position by a lock nut 43 of a thickness slightly exceeding the thickness of the inner end portion 8 of the seat frame so that when the bolts 35, 36 and 37 are removed the bearing sleeve is of course removed with the bolt. The bolt 36 in addition to passing through the slotted opening 33 in the housing also passes through a cam slot 44 in pulley or sprocket 24.

My device operates as follows: Referring first to Figs. 3, 7 and 8, these illustrate the relative position of the various parts when the cover is in concealed position. That is, the cover extends upwardly into the space 45 (see Fig. 2) between the inner and outer back portions of the seat frame. In concealed position, the guiding pins or bolts 35, 36 and 37 occupy the positions in slots 32, 33 and 34 respectively as shown in Fig. 3, and the pin 36 is at the extreme inner portion of the spiral cam slot 44, in pulley or sprocket 24 as shown in Fig. 4.

To draw the cover into position for use the seat 46 is raised from the position shown in Fig. 3 and pulled forward to the position shown in Fig. 5. This movement of the seat will leave a space 47 at the back of the seat (see Fig. 5) through which the hand may be passed to grasp the portion 48 (see Figs. 7 and 8) of the cover. If desired, handles or grips 49 may be provided on the portion 48 as shown in Figs. 7 and 8. Having grasped the portion 48 or the grips 49, the cover is pulled upwardly into the position shown in Figs. 1 and 2, the rods 12 and 13 and the resilient connectors between the cover and the endless belt or chain 14 passing through the slotted openings 50 in the side of the housing, perhaps best shown in Figs. 1 and 2. This slot terminates at the top of the housing and in order to retain the cover in the position shown in Figs. 1 and 2 the lower edge of the slotted opening 50 is provided with a notch 51 (see Fig. 12) into which the rod 13 will drop, thus securing the cover in place.

As the cover is drawn from its concealed position the endless belt or chain 14 cooperating with pulley or sprocket 24 will turn this sprocket in the direction of the arrow shown in Figs. 4, 6 and 7 and the coaction of the bolt or pin 36 with the spiral cam slot 44 in pulley or sprocket 24 will force the entire housing outwardly and upwardly to the position shown in Fig. 5. This outer and forward movement will perhaps be best understood by a consideration of Figs. 4 and 6. Fig. 4 indicates the relative position of the pin 36 and the cam slot 44 when the cover is in concealed position. In this figure it will be observed that the bolts or pins 35, 36 and 37 are in the extreme upper portion of the slots 32, 33 and 34 respectively. As the pulley or sprocket 24 is turned the entire housing will be moved outwardly and upwardly by the coaction of fixed pin 36 and spiral cam slot 44, and the relative positions of the various pins and slots will assume the positions shown in Fig. 6. Thus, the cover, when pulled into position for use, will be substantially spaced from the upholstery. It will, of course, be understood that under some conditions the cams and associated pins may be omitted. Such omission is particularly desirable in the use of the cover with the seats of theaters and in other situations where the cam members would be undesirable.

To provide a cover for the seat proper, I secure a flexible mat 52 of cane or straw, to the lower portion 53 of the cover for the back of the seat. This straw mat is folded back to lie over the fabric portion of the cover and is secured thereto by coacting snap fasteners 54 and 55 when the cover is in concealed position. Being flexible, and lying closely to the fabric when thus secured, it rolls back and forth with the cover for the back portion of the seat, and may be readily let down for use, as shown in Figs. 1 and 2, by loosening the snap fasteners.

While I have described my invention in its preferred embodiment, it is to be understood that the drawings are merely illustrative and that the words which I have used are words of description rather than words of limitation. Hence, changes within the purview of the appended claims may be made without departing from the true scope and spirit of my invention.

What I claim is:—

1. In combination, a main seat back, a cover therefor, means for concealing said cover when not in use, guide means for said cover located in front of said seat back and means for moving said cover along said guide means to a position where it is in spaced relation to said main seat back, said guide means retaining the said cover in spaced relation to said seat back when in use.

2. In combination, a main seat back, a cover therefor, means for concealing said cover when not in use, guide means for said cover located in front of said seat back, and resilient means for moving said cover along said guide means to a position where it is in spaced relation to said main seat back, said guide means retaining the said cover in said spaced relation to said seat back when in use.

3. In combination, a main seat back comprising a frame, a movable cover, means supported by said frame for normally retaining said cover in concealed position, guide means for said cover located forwardly of said main seat back, and means whereby said cover may be moved along said guide means and maintained in spaced relation to said main seat back.

4. In combination, a movable seat proper, a normally exposed main seat back, a movable cover therefor, means for moving and retaining said cover in spaced relation to said seat back, and means responsive to the movement of said first named means in a direction to space the cover from said seat back for moving said cover forwardly with reference to said seat back.

5. In combination, a forwardly movable seat proper, a normally exposed main seat back, a movable cover therefor, means for moving said cover relatively to said seat back, and means responsive to the movement of the first named means in a direction to space the cover from said seat back for moving said cover forwardly and upwardly into spaced relation with reference to said seat back.

6. In combination, a forwardly movable seat proper, a main seat back, a movable cover therefor, means for moving said cover into and maintaining the same in spaced relation to said seat back, and cam means responsive to the first named means for moving said cover forwardly and upwardly.

7. In combination, a seat proper, a main seat back, a movable cover therefor formed of flexible material, a flexible mat secured to said cover, the front portion of said mat being adapted to be detached from said cover and overlie said seat proper, and means whereby said cover and said mat may be moved into concealed position behind said seat back or overlie said seat back and said main seat respectively.

8. In combination, a main seat comprising spaced back plates and spaced end plates at each end of the seat and forming a unitary structure, a main seat back, a cover therefor, members housed within the spaces between said end plates and mounted therein, actuating means mounted within said members for operating said cover, said members comprising guide means, portions of which are located opposite the space between said back plates and other portions thereof located in front of the main seat back whereby the cover is concealed between said back plates in one position thereof and lies in spaced relation over said seat back in another position thereof.

9. In combination, a main seat comprising spaced back plates and spaced end plates at each end of the seat and forming a unitary structure, a main seat back, a cover therefor, members housed within the spaces between said end plates and mounted therein, actuating means mounted within said members and comprising endless rotatable members for operating said cover, said members comprising guide means, portions of which are located opposite the space between said back plates and other portions thereof located in front of the main seat back whereby the cover is concealed between said back plates in one position thereof, and lies in spaced relation over said seat back in another position thereof.

10. In combination, a main seat comprising spaced back plates and spaced end plates at each end of the seat and forming a unitary structure, a main seat back, a cover therefor, members housed within the spaces between said end plates and mounted therein, actuating means mounted within said members for operating said cover, said members comprising guide means, portions of which are located opposite the space between said back plates and other portions thereof located in front of the main seat back whereby the cover is concealed between said back plates in one position thereof and lies in spaced relation over said seat back in another position thereof, and means for locking said cover in spaced relation to said main back seat.

11. In combination, a main seat comprising spaced back plates and spaced end plates at each end of the seat and forming a unitary structure, a main seat back, a cover therefor, members housed within the spaces between said end plates and mounted therein, actuating means mounted within said members for operating said cover, said members comprising guide means, portions of which are located opposite the space between said back plates and other portions thereof located in front of the main seat back whereby the cover is concealed between said back plates in one position thereof and lies in spaced relation over said seat back in another position thereof, said cover being attached to said actuating means at a plurality of points.

12. In combination, a main seat comprising spaced back plates and spaced end plates at each end of the seat and forming a unitary structure, a main seat back, a cover therefor, members housed within the spaces between said end plates and mounted therein, endless rotatable members mounted within said members, said members being provided with inwardly facing curved slots substantially conforming in contour to the front of the seat, and members passing through said slots for attaching said cover to said rotatable members at a plurality of points.

HARRY E. KUEHN.